(12) United States Patent
Seo et al.

(10) Patent No.: US 9,098,075 B2
(45) Date of Patent: Aug. 4, 2015

(54) METHOD AND SYSTEM FOR CONTROLLING LIFTING OPERATION OF WEARABLE ROBOT

(75) Inventors: Jung Ho Seo, Gyeonggi-do (KR); Woo Sung Yang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 392 days.

(21) Appl. No.: 13/529,227

(22) Filed: Jun. 21, 2012

(65) Prior Publication Data

US 2013/0173058 A1    Jul. 4, 2013

(30) Foreign Application Priority Data

Jan. 2, 2012 (KR) .......................... 10-2012-0000025

(51) Int. Cl.
| | |
|---|---|
| *G05B 15/00* | (2006.01) |
| *G05B 19/00* | (2006.01) |
| *B25J 9/06* | (2006.01) |
| *B25J 9/16* | (2006.01) |

(52) U.S. Cl.
CPC .. *G05B 15/00* (2013.01); *B25J 9/06* (2013.01); *B25J 9/16* (2013.01)

(58) Field of Classification Search
CPC ................ B25J 9/06; B25J 9/16; G05B 15/00
USPC ................ 700/245–264; 318/568.12, 568.13, 318/568.2, 568.22, 568.18
See application file for complete search history.

(56) References Cited

U.S. PATENT DOCUMENTS

| | | | | |
|---|---|---|---|---|
| 7,319,919 | B2* | 1/2008 | Takenaka et al. | 700/245 |
| 7,664,572 | B2* | 2/2010 | Takenaka et al. | 700/253 |
| 2011/0040407 | A1* | 2/2011 | Lim et al. | 700/253 |

FOREIGN PATENT DOCUMENTS

KR    10-2009-0118152 A    11/2009

OTHER PUBLICATIONS

Lee, B.K. et al. "Control of Human Intent Based Upper Limb Exoskeleton Robot", English translation, 9 pages.
Lee, H.D. et al "Human Intent Measurement Method for Upper Limb Exoskeleton using the Physical Human-Robot Interaciton", English translation. 10 pages.
Lee, Seung Yeol et al, "Human-Robot Cooperative Control for Construction Robot", English Abstract, pp. 285-194, 2007.

* cited by examiner

*Primary Examiner* — Jason Holloway
*Assistant Examiner* — Rachid Bendidi
(74) *Attorney, Agent, or Firm* — Mintz Levin Cohn Ferris Glovsky and Popeo, P.C.; Peter F. Corless

(57) ABSTRACT

Disclosed herein is a method and system for controlling the lifting operation of a wearable robot. A final force that must be applied by the robot to an object upon conducting a lifting operation is derived based on a difference between a weight force applied by the object to the robot and an apply force applied by a wearing user to the robot. A target position to which the robot lifts the object is set. A spring-damper virtual force model is applied to an end of the robot and to joints of the robot, the final force is converted into final torques required by the joints of the robot by being incorporated into the virtual force model, and then the joints of the robot are operated based on the final torques. The final force is fixed once the robot has lifted the object to the target position.

8 Claims, 3 Drawing Sheets

METHOD AND SYSTEM FOR CONTROLLING LIFTING OPERATION OF WEARABLE ROBOT

CROSS-REFERENCE TO RELATED APPLICATIONS

The present application claims priority to Korean Patent Application No. 10-2012-0000025 filed on Jan. 2, 2012, the entire contents of which is incorporated herein for purposes by this reference.

FIELD OF THE INVENTION

The present invention relates to a method and system for controlling the lifting operation of a wearable robot, which can perform control so that a wearing user can always lift objects having various weights with a constant force regardless of a variation in the weight of an object to be lifted.

BACKGROUND OF THE INVENTION

A wearable muscular power assist robot must lift and transfer an object while moving depending on a wearing user's intention. When the robot lifts a heavy object, the force of the wearing user is transferred to the robot, and the force transferred to the robot is amplified, thus enabling the robot to lift the heavy object. The present invention relates to a method of performing control so that a wearing user can always lift objects having various weights with a constant force regardless of a variation in the weight of an object to be lifted.

An existing wearable muscular power assist robot is configured such that an electromyogram (EMG) sensor is attached to the body of a wearing user, and has been used to determine the motion intention signal of the wearing user using the contraction and relaxation of a muscle, send the signal to a robot controller and then drive an actuator. However, such a robot is disadvantageous in that when the wearing user moves, a phenomenon frequently occurs in which the EMG sensor is not closely attached in an exact location to the body of the user, with the result that the motion intention signal of the wearing user is distorted.

Further, the robot is disadvantageous in that the operation of the robot reacts sensitively to a variation in the weight of an object to be lifted.

Therefore, there is a need to implement such a control system using only a force sensor so as to guarantee the precision of sensing and precisely control the robot based on sensing. An attachment-type EMG sensor is considerably inaccurate in a certain aspect and is expensive, thereby making it difficult to commercialize.

As a result, technology is required that allows a wearing user to feel the same load even when he or she lifts objects having any weight, by precisely measuring a required force using a force sensor and by easily controlling a lifting operation based on the required force, thus reducing a burden on the body of the wearing user.

The foregoing is intended merely to aid in the better understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the prior art, and an object of the present invention is to provide a method and system for controlling the lifting operation of a wearable robot, which allows the intention of a wearing user to be incorporated into the end of the robot in the form of a force, so that the end of the robot can be operated in compliance with the intention, and which drives the wearable robot so that the wearing user is subjected to a constant force.

In order to accomplish the above object, the present invention provides a method of controlling a lifting operation of a wearable robot, including (a) deriving a final force that must be applied by the robot to an object upon conducting a lifting operation, based on a difference between a weight force applied by the object to the robot and an apply force applied by a wearing user to the robot; (b) setting a target position to which the robot lifts the object; (c) applying a spring-damper virtual force model to an end of the robot that holds the object and to individual joints of the robot, converting the final force into final torques required by the respective joints of the robot by incorporating the final force into the virtual force model, and then operating the respective joints of the robot based on the final torques; and (d) fixing the final force once the robot has lifted the object up to the target position.

Preferably, step (d) can include when the robot will transfer the object with the object having been lifted, converting the final force into the final torques required by the respective joints of the robot in consideration of a target transfer distance in a state in which the final force is fixed, and operating the joints of the robot based on the final torques.

Preferably, the final force in step (c) is converted and incorporated into the final torques required by the joints of the robot using a Jacobian transpose.

Preferably, an operating force of the end of the robot required to transfer the object is represented by a spring-damper virtual force model based on the target transfer distance, and the method further comprises converting and incorporating the operating force into the final torques required by respective joints of the robot using a Jacobian transpose.

Further, the present invention provides a system for controlling a lifting operation of a wearable robot, including a force sensor unit configured to sense a weight force applied by an object to the robot and an apply force applied by a wearing user to the robot; drive units provided at respective joints of the robot and configured to generate a driving force; and a control unit configured to derive a final force that must be applied by the robot to the object upon conducting a lifting operation, based on a difference between the weight force and the apply force, apply a spring-damper virtual force model to an end of the robot that holds the object and to the individual joints of the robot, convert the final force into final torques required by the drive units of the respective joints, and control the drive units of the joints based on the final torques.

Preferably, the force sensor unit can include a first sensor for measuring the weight force and a second sensor for measuring the apply force.

Preferably, the control unit can set a target position to which the object is to be lifted, and control the drive units of the joints in a state in which the final force is fixed once the lifting operation to the target position has been performed.

Preferably, the control unit can be configured such that when the robot will transfer the object with the object having been lifted, the control unit converts the final force into the final torques required by the respective joints of the robot in consideration of a target transfer distance in the state in which the final force is fixed, and then controls the drive units of the respective joints of the robot based on the final torques.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, embodiments of a method and system for controlling the lifting operation of a wearable robot according to the present invention will be described in detail with reference to the attached drawings.

Figure 1:
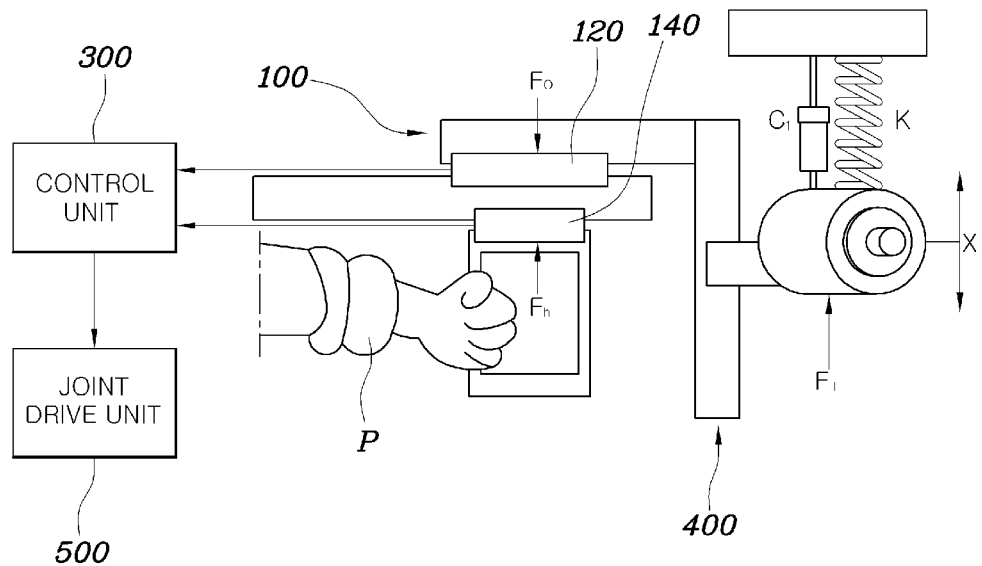
FIG. 1 is a diagram showing a system for controlling the lifting operation of a wearable robot according to an embodiment of the present invention.
Figure 2:
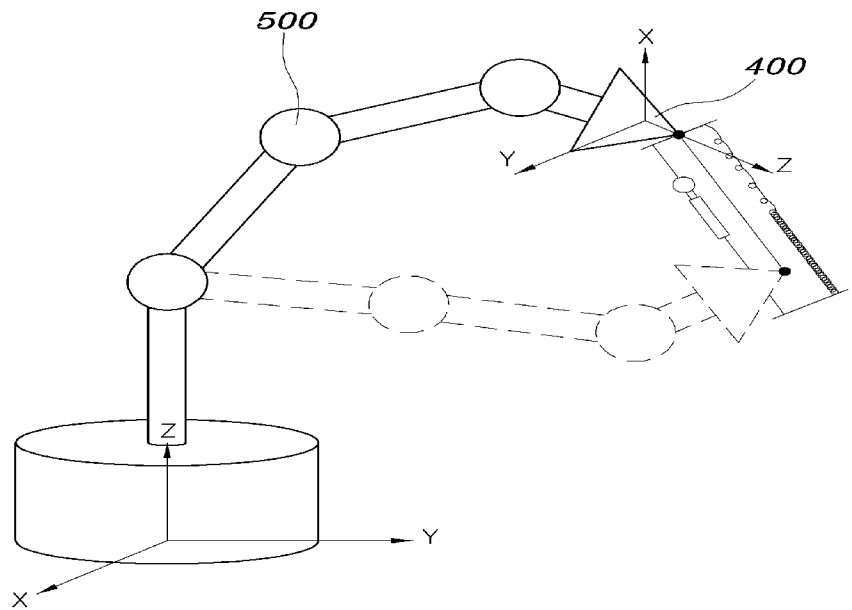
FIG. 2 is a diagram showing the control of the driving unit of the wearable robot of FIG. 1.
Figure 5:
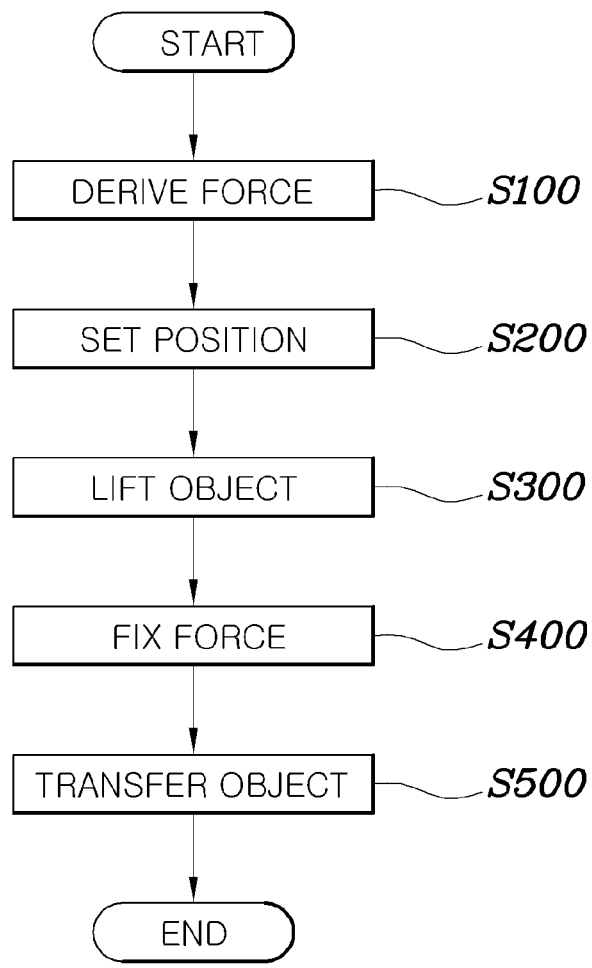
FIG. 5 is a flowchart showing a method of controlling the lifting operation of the wearable robot according to an embodiment of the present invention.

FIG. 1 is a diagram showing a system for controlling the lifting operation of a wearable robot according to an embodiment of the present invention, FIG. 2 is a diagram showing the control of the driving unit of the wearable robot of FIG. 1, and FIG. 5 is a flowchart showing a method of controlling the lifting operation of the wearable robot according to an embodiment of the present invention.

Referring to FIG. 5, a method of controlling the lifting operation of the wearable robot according to the present invention includes a force derivation step S100, a position setting step S200, a lifting step S300, and a fixing step S400. In step S100, a final force $F_T$ that must be applied by the robot to an object upon conducting a lifting operation is derived on the basis of a difference between a weight force $F_o$ applied by the object to the robot and an apply force $F_h$ applied by a wearing user to the robot. In step S200, a target position to which the robot must lift the object is set. In step S300, a spring-damper virtual force model is applied to the end of the robot that holds the object and to individual joints of the robot, the derived final force $F_T$ is converted into final torques required by the respective joints of the robot by being incorporated into the virtual force model, and the individual joints of the robot are operated based on the final torques. In step S400, once the robot has lifted the object up to the target position, the final forces are fixed.

As shown in the system of FIG. 1, the present invention performs lifting control using information about two types of forces.

The forces used in this way include the weight force $F_o$ applied by the object to the robot and the apply force $F_h$ applied by the wearing user to the robot, and these forces are sensed and used. The final force $F_T$ that must be applied by the robot to the object upon conducting a lifting operation is derived from the difference between the weight force $F_o$ and the apply force $F_h$, as given by the following Equation (1):

$$F_T = F_o - F_h \quad (1)$$

This operation is performed by a control unit, which is configured to sense the weight force and the apply force and derive the final force and to control the drive units of the respective joints of the robot, thus allowing the robot to hold and lift the object. Meanwhile, setting the maximum value of the apply force $F_h$ applied by the wearing user makes it possible to protect the body of the wearing user because the wearing user does not need to apply more than a predetermined amount of force.

FIG. 2 is a diagram showing the control of the drive unit of the wearable robot of FIG. 1, wherein the wearable robot according to the present invention can adopt a multi-degree-of-freedom-type driving scheme.

This is advantageous in that, as shown in the drawing, since a procedure for setting the force of the end 400 of the robot so as to drive the motors at the respective joints of the robot, and distributing the force to the individual joints is performed, the joints do not need to be separately calculated/induced, thus enabling computations to be rapidly performed and the robot to be easily implemented.

For this, a spring-damper virtual force model is applied both to the end 400 of the robot and to individual joint drive units 500, so that the derived final force $F_T$ is converted into the final torques required by the respective joints of the robot by being incorporated into the virtual force model, and then the joints of the robot are operated based on the final torques. Detailed control formulas can be represented by the following Equation (2):

$$\tau = J^T F$$

$$\tau_{VFI} = -C\dot{q} - k_0 \Delta q - J^T F + g(q)$$

$$\tau_{VFI} = -C\dot{q} - k_0 \Delta q - J^T (k\Delta x + c\Delta \dot{x}) + g(q) \quad (2)$$

where F: virtual force
k: spring force constant
C: Damping force constant
$\tau$: input torque
$\tau_{VFI}$: virtual force inducer torque
J: Jacobian matrix
C: damping coefficient
$k_o$: stiffness gain
q: joint angles
g(q): gravity term
$\Delta x$: $x - x_d$ Referring to Equation (2), the input torque $\tau$ is calculated as torques $\tau$ at which the force F at the end of the robot is distributed into individual joints using a Jacobian transpose $J^T$. Further, in the final torques (torques that are to be driven by the motors of the joints) that are actually distributed into the respective joints, determinant C and $k_0$ are introduced via the virtual spring-damper model of each joint, q related to angles is used, the force F required for motions at the end of the robot is also distributed into the individual joints through the Jacobian transpose $J^T$ and a sag g(q) caused by the gravity of the robot is incorporated into and appears on the final torques.

Meanwhile, even in the case of the end 400, spring and damping coefficients k and c are introduced via the virtual spring-damper model, and the distance $\Delta x$ which the end must be moved is introduced and input.

Further, when the lifting control according to the present invention is applied to the multi-degree-of-freedom robot, the torque can be represented by the following Equation (3):

$$\tau_{VF} = -C\dot{q} - k_0 \Delta q - J^T(k\Delta x + c\Delta \dot{x}) + g(q) + J^T F_T \quad (3)$$

That is, the final force $F_T$ is incorporated into the end of the multi-degree-of-freedom robot and is then distributed to the individual joints using the Jacobian transpose $J^T$, thus enabling the control of the lifting operation to be performed.

Figure 3:
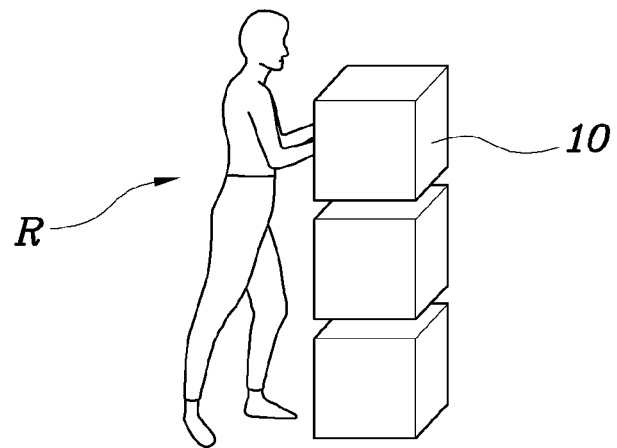
FIGS. 3 and 4 are diagrams showing the lifting operation and the transfer operation of the wearable robot according to an embodiment of the present invention.
Figure 4:
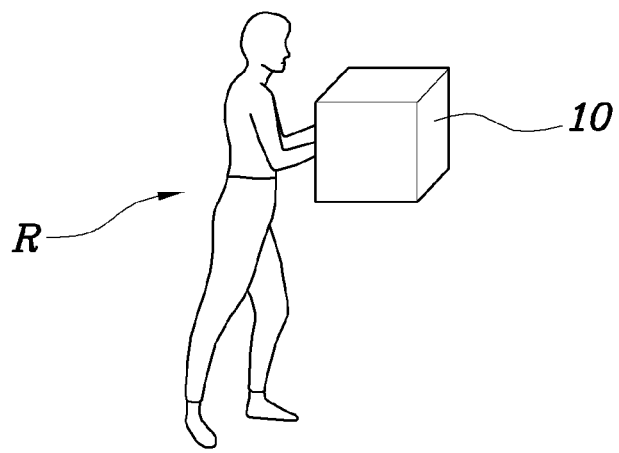

In detail, FIGS. 3 and 4 are diagrams showing the lifting operation and the transfer operation of the wearable robot according to an embodiment of the present invention, wherein FIG. 3 illustrates a lifting operation and FIG. 4 illustrates a transfer operation performed after the lifting operation.

As shown in FIG. 3, when the lifting operation is performed, the control of the lifting operation is performed using $J^T F_T$ of Equation (3). After the lifting operation, $J^T F_T$ is fixed upon conducting a transfer operation, as shown in FIG. 4, and the final torques are applied to the drive units of the respective joints using the spring and damping coefficients k and c of the end according to the transfer distance $\Delta x$.

That is, the fixing step S400 includes, when the robot R must transfer an object 10 with the object 10 having been lifted, the transfer step S500 of converting the final force into final torques required by the respective joints of the robot in consideration of a target transfer distance in the state in which the final force is fixed, and operating the respective joints of the robot R on the basis of the final torques.

Further, as described above, the lifting step S300 is configured to convert and incorporate the derived final force into the final torques required by the respective joints of the robot using the Jacobian transpose. Further, the transfer step S500 is configured to represent the operating force of the end of the robot, required to transfer the object, by a spring-damper virtual force model based on the target transfer distance, and convert and incorporate the operating force into the final torques required by the respective joints of the robot using the Jacobian transpose. Accordingly, during the lifting operation, the wearing user can lift objects having various weights using a constant force. Even upon transferring objects after the lifting operation, the final torques are separately calculated for the lifting and transferring to facilitate the control of the robot.

Meanwhile, the system for controlling the lifting operation of the wearable robot according to the present invention to perform the control method includes a force sensor unit 100, drive units 500, and a control unit 300. The force sensor unit 100 senses a weight force $F_o$ applied by an object to the robot and an apply force $F_h$ applied by a wearing user to the robot. The drive units 500 are provided at the respective joints of the robot and configured to generate driving forces. The control unit 300 derives the final force $F_T$ that must be applied by the robot to the object upon conducting a lifting operation, on the basis of a difference between the weight force $F_o$ and the apply force $F_h$. Further, the control unit 300 applies a spring-damper virtual force model to the end 400 of the robot which holds the object and to the individual joints of the robot. Furthermore, the control unit 300 converts the final force $F_T$ into final torques required by the drive units 500 of the respective joints by incorporating the final force $F_T$ into the virtual force model, and also controls the drive units 500 of the joints on the basis of the final torques.

Further, the force sensor unit 100 includes a first sensor 120 for measuring the weight force $F_o$ and a second sensor 140 for measuring the apply force $F_h$, and derives the final force $F_T$ from the forces measured by the respective sensors.

Furthermore, the control unit 300 sets a target position to which the robot must lift the object, and controls the drive units 500 of the respective joints in the state in which the final force $F_T$ is fixed once the object has been lifted up to the target position. When the robot must transfer the object with the object having been lifted, the control unit 300 can convert the final force into the final torques required by the respective joints of the robot in consideration of the target transfer distance in the state in which the final force $F_T$ is fixed, and then control the drive units 500 of the joints of the robot on the basis of the final torques.

As described above, according to the method and system for controlling the lifting operation of the wearable robot having the above construction, a force control-based lifting control method for preventing a user who wears the wearable robot from being affected by a musculoskeletal disease can be provided. Further, the upper limbs of the wearable robot are controlled to be operated in conformity with the intention of the wearing user depending on the circumstances. Furthermore, the conventional robots perform control using various types of sensor information, whereas the present invention can perform control relatively easily only using the information of the force sensor.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

Furthermore, the control logic of the present invention can be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

What is claimed is:

1. A method of controlling a lifting operation of a wearable robot, comprising:
    providing the wearable robot, a force sensor unit configured to sense a weight force applied by an object to the robot and an apply force applied by a wearing user to the robot, drive units configured to generate a driving force, and a control unit;
    deriving, by the control unit, a final force that must be applied by the robot to the object upon conducting a lifting operation, based on a difference between the weight force applied by the object to the robot and the apply force applied by the wearing user to the robot;
    setting, by the control unit, a target position to which the robot lifts the object;
    applying, by the control unit, a spring-damper virtual force model to an end of the robot that holds the object and to individual joints of the robot, converting the final force into final torques required by the respective joints of the robot by incorporating the final force into the virtual force model, and then operating the respective joints of the robot based on the final torques; and
    fixing by the control unit, the final force once the robot has lifted the object up to the target position.

2. The method according to claim 1, wherein the step of fixing the final force comprises:
    when the robot will transfer the object with the object having been lifted, converting the final force into the final torques required by the respective joints of the robot in consideration of a target transfer distance in a state in which the final force is fixed, and operating the joints of the robot based on the final torques.

3. The method according to claim 1, wherein the final force in the step of applying the spring-damper virtual force model is converted and incorporated into the final torques required by the joints of the robot using a Jacobian transpose.

4. The method according to claim 2, wherein an operating force of the end of the robot required to transfer the object is represented by a spring-damper virtual force model based on the target transfer distance, and the method further comprises converting and incorporating the operating force into the final torques required by respective joints of the robot using a Jacobian transpose.

5. A system for controlling a lifting operation of a wearable robot, comprising:
  the wearable robot;
  a force sensor unit configured to sense a weight force applied by an object to the robot and an apply force applied by a wearing user to the robot;
  drive units provided at respective joints of the robot and configured to generate a driving force; and
  a control unit configured to:
    derive a final force that must be applied by the robot to the object upon conducting a lifting operation, based on a difference between the weight force and the apply force,
    apply a spring-damper virtual force model to an end of the robot that holds the object and to the individual joints of the robot,
    convert the final force into final torques required by the drive units of the respective joints, and
    control the drive units of the joints based on the final torques.

6. The system according to claim 5, wherein the force sensor unit comprises a first sensor for measuring the weight force and a second sensor for measuring the apply force.

7. The system according to claim 5, wherein the control unit sets a target position to which the object is to be lifted, and controls the drive units of the joints in a state in which the final force is fixed once the lifting operation to the target position has been performed.

8. The system according to claim 5, wherein the control unit is configured such that when the robot will transfer the object with the object having been lifted, the control unit converts the final force into the final torques required by the respective joints of the robot in consideration of a target transfer distance in the state in which the final force is fixed, and then controls the drive units of the respective joints of the robot based on the final torques.

* * * * *